United States Patent [19]

Kayanoki

[11] Patent Number: 5,963,373
[45] Date of Patent: Oct. 5, 1999

[54] PRIMER COMPOSITION

[75] Inventor: Hisayuki Kayanoki, Ichihara, Japan

[73] Assignee: Nippon Arc Co., Ltd., Japan

[21] Appl. No.: 08/817,881

[22] PCT Filed: Sep. 10, 1996

[86] PCT No.: PCT/JP96/02577

§ 371 Date: Apr. 30, 1997

§ 102(e) Date: Apr. 30, 1997

[87] PCT Pub. No.: WO97/10306

PCT Pub. Date: Mar. 20, 1997

[30] Foreign Application Priority Data

Sep. 11, 1995 [JP] Japan .................................. 7-233.023
Sep. 26, 1995 [JP] Japan .................................. 7-247.985

[51] Int. Cl.$^6$ .............................. G02B 1/10; G02B 1/11; G02C 7/02; C08G 18/38
[52] U.S. Cl. ...................... 359/581; 351/166; 428/412; 428/413; 428/414; 428/419; 428/423.1; 428/425.5; 428/425.9; 528/45; 528/49; 528/59; 528/66; 528/73; 528/75; 528/76; 528/77; 528/79; 528/80; 528/81; 528/83; 560/26; 560/115; 560/158
[58] Field of Search .................... 528/45, 49, 73, 528/76, 77, 79, 75, 80, 83, 81, 59, 66; 560/26, 158, 115; 351/166; 359/581, 642; 428/423.1, 425.5, 425.9, 412, 413, 414, 419

[56] References Cited

U.S. PATENT DOCUMENTS

| | | | |
|---|---|---|---|
| 4,002,688 | 1/1977 | Loeb et al. ................ | 568/641 |
| 4,215,210 | 7/1980 | Okayama et al. ........... | 528/93 |
| 4,748,195 | 5/1988 | Hackl et al. .............. | 523/445 |
| 4,801,662 | 1/1989 | Fischer .................... | 525/504 |
| 4,975,328 | 12/1990 | Hirose et al. ............. | 428/413 |
| 5,147,959 | 9/1992 | Nishimoto et al. ......... | 528/48 |
| 5,310,577 | 5/1994 | Mase et al. ............... | 427/164 |
| 5,314,947 | 5/1994 | Sawaragi .................. | 524/780 |
| 5,346,981 | 9/1994 | Sarpeshkar et al. ........ | 528/85 |
| 5,367,019 | 11/1994 | Sawaragi .................. | 524/780 |
| 5,496,641 | 3/1996 | Mase et al. ............... | 428/423.1 |
| 5,654,090 | 8/1997 | Kayanoki .................. | 428/329 |

FOREIGN PATENT DOCUMENTS

| | | |
|---|---|---|
| 0 274 908 | 7/1988 | European Pat. Off. . |
| 0 358 406 | 3/1990 | European Pat. Off. . |
| 0 500 346 | 8/1992 | European Pat. Off. . |
| 0 518 687 | 12/1992 | European Pat. Off. . |
| 2-191688 | 7/1990 | Japan . |
| 3-503062 | 7/1991 | Japan . |
| 4-366801 | 12/1992 | Japan . |
| 5-2102 | 1/1993 | Japan . |
| 5-25299 | 2/1993 | Japan . |
| 5-93803 | 4/1993 | Japan . |
| 5-142401 | 6/1993 | Japan . |
| 5-164902 | 6/1993 | Japan . |
| 6-82604 | 3/1994 | Japan . |
| 6-118203 | 4/1994 | Japan . |
| 6-102776 | 12/1994 | Japan . |
| 6-337379 | 12/1994 | Japan . |

OTHER PUBLICATIONS

*Database WPI*, Section Ch, Week 8515, AN 85–090468 (abstract of JP 60–040120) (Mar., 1985).
*Database WPI*, Section Ch, Week 9309, AN 93–071621 (abstract of JP 5–019102) (Jan. 1993).

*Primary Examiner*—Rabon Sergent
*Attorney, Agent, or Firm*—Wenderoth, Lind & Ponack, L.L.P.

[57] ABSTRACT

Provided is a primer composition which gives a cured film having a high refractive index and impact resistance, the primer composition containing, as main film-forming components, a bromine compound containing a unit derived from tetrabromobisphenol A and a polyisocyanate, or a prepolymer obtained by reacting them.

14 Claims, No Drawings

PRIMER COMPOSITION

TECHNICAL FIELD

The present invention relates to a primer composition. More specifically, it relates to a primer composition which gives a cured film having a high refractive index and impact resistance.

TECHNICAL BACKGROUND

Being susceptible to damage, most plastic lenses are provided with hard coating(s) by applying a silicon-containing primer or other hard-coating primer to their surface(s) and curing the primer with ultraviolet light.

Further, plastic lenses are sometimes coated with anti-reflection films formed by vapor deposition of an inorganic substance on their surface for preventing surface reflection. However, these lenses have low impact resistance and have a defect that they break in a falling ball test (FDA standards, U.S.A.).

For overcoming the above problem, there is a technique of interposing a primer layer formed of a urethane resin between a plastic lens substrate and a hard coating (see JP-A-5-25299).

Meanwhile, plastic lenses whose thickness can be decreased and whose lens substrate has a high refractive index, specifically a refractive index of 1.54 to 1.67, are widely available in recent years.

A silicon-containing hard coating generally has a refractive index of between 1.40 and 1.50, but since it is usual that the hard coating is coated by dip coating, a non-uniformity is caused in a coating thickness and difference in the coating thickness is liable to appear as interference fringes.

For overcoming the above problem, a hard coating having a high refractive index has been developed (see JP-A-5-2102, JP-A-5-164902 and JP-B-6-102776).

However, although the interference fringes can be decreased by forming a hard coating having a high refractive index directly on a lens substrate having a high refractive index, there is a defect that when an anti-reflection film is further formed thereon, the impact resistance of the lens decreases.

The lens can be improved in impact resistance by forming the above primer layer formed of a urethane resin, but there is another defect that interference fringes occur in this case because the primer layer has a refractive index of 1.50 to 1.52.

Recently, the following four laid-open publications disclose primers which improve a lens in impact resistance and also give a cured film having a high refractive index.

JP-A-4-366801 discloses a plastic lens obtained by laminating a primer layer and a hard coating layer, which satisfy the following two formulae, and a mono- or multi-layered anti-reflection layer formed by vapor deposition of an inorganic substance on the surface of a plastic lens substrate having a refractive index $n_s$ of 1.50 to 1.70 consecutively in the above order, the said primer layer being a polyurethane containing at least one member selected from halogen atoms excluding fluorine and a sulfur atom and having a refractive index $n_p$ of 1.45 to 1.60.

$$\sqrt{n_S \cdot n_H} + \frac{|n_S - n_H|}{4} \geq n_P \geq \sqrt{n_S \cdot n_H} - \frac{|n_S - n_H|}{4}$$

wherein $n_s$ and $n_p$ are as specified above and $n_H$ is a refractive index of the hard coating.

$$D = \frac{\lambda}{4n_p}$$

wherein d is a thickness of the primer layer and $\lambda$ is a wavelength of visible light which is between 450 and 650 nm.

JP-A-5-142401 discloses a plastic lens which is different from the above plastic lens disclosed in JP-A-4-366801 only in that the primer layer is formed of a compound of at least one metal selected from the group consisting of Al, Ti, Zr, Sn and Sb and polyurethane.

JP-A-6-82604 discloses an optical element formed by laminating a silicone cured coating and an inorganic anti-reflection film on the surface of an organic glass, wherein a primer layer is interposed between the said organic glass and the cured film of cured silicone, the primer layer being formed of a coating composition comprising, as essential effective components, the following components: (a) urethane elastomer, (b) inorganic fine particles and (c) hydrolyzate of organoalkoxysilane.

JP-A-6-118203 discloses a plastic lens obtained by forming a hard coating on the surface of a lens substrate of a plastic through a primer layer, wherein the primer layer is formed of a dispersion of 5 to 100 parts by weight of colloidal metal oxide fine particles having a particle diameter of 4 to 150 nm in 100 parts by weight of a heat-curable urethane resin, the said colloidal metal oxide fine particles containing 60 to 99% by weight of titanium oxide.

Further, JP-A-6-337379 discloses a plastic lens obtained by forming a primer layer as an impact-absorbing layer and a scratch-resistant hard coating layer on at least one surface of a plastic lens substrate in the above order from the substrate side, the said plastic lens substrate and the said primer layer having nearly equivalent refractive indices.

However, the primer layers disclosed in JP-A-4-366801 and JP-A-5-142401 have a refractive index lower than about 1.57, and when these are formed on a lens having a refractive index of 1.60, interference fringes remain.

In the primers containing inorganic fine particles, disclosed in JP-A-6-82604 and JP-A-6-118203, the dispersing of the inorganic fine particles has its own limit, the primer layers have a low refractive index, and when these are formed on a lens having a refractive index of 1.60, interference fringes remain.

In the primer layer disclosed in the last JP-A-6-337379, it is necessary to control the primer layer so as to have a refractive index nearly equivalent to that of a plastic lens substrate, and therefore, extreme difficulty is practically involved.

DISCLOSURE OF THE INVENTION

It is an object of the present invention to provide a novel primer composition.

It is another object of the present invention to provide a primer composition which gives a cured film having a high refractive index and impact resistance.

It is further another object of the present invention to provide a plastic lens having a high refractive index, which has an anti-reflection film and yet has impact resistance and moreover, which is free of interference fringes.

Other objects and advantages of the present invention will be apparent from the following description.

According to the present invention, first, the above objects and advantages of the present invention are achieved by a primer composition comprising, as main coating film-forming components,
at least one bromine compound selected from the group consisting of a compound of the following general formula (A),

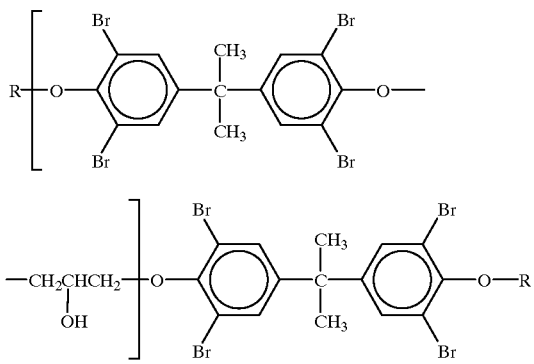

wherein R is

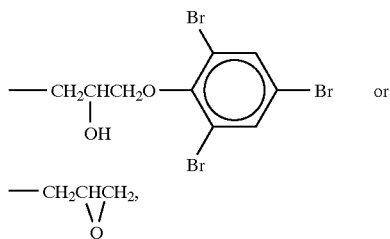

and n is a number of 1 to 10, and a compound of the following general formula (B),

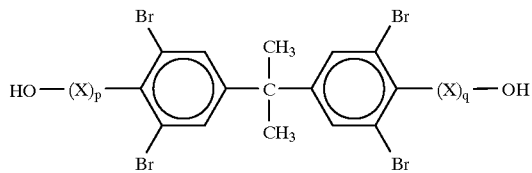

wherein X is —CH$_2$CH$_2$O— or

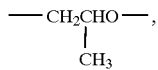

and each of p and q is independently a number of 1 to 3, and a polyisocyanate or a prepolymer obtained by reacting the above components.

The bromine compound used in the present invention is represented by the general formula (A) or (B). These compounds have hydroxyl group(s) capable of reacting with a polyisocyanate.

The compounds of the general formulae (A) and (B) are commercially available. The compound of the general formula (A) is commercially available, e.g., under the names of PRATHERM (trade name: Dainippon Ink & Chemicals, Inc.), EC-14, EC-20, EC-30, EP-13, EP-16, EP-20, EP-100, EP-200 and EP-500; and SR-T3040 and SR-T7040 (Sakamoto Yakuhin Kogyo K.K.). The compound of the general formula (B) is commercially available, e.g., under the name of FIREGUARD 3600 (trade name: Teijin Chemicals Ltd.).

The polyisocyanate can be selected from aliphatic polyisocyanates and polyisocyanates having an aromatic ring.

The polyisocyanate contains at least 2 isocyanate groups (NCO groups) in the molecule. Diisocyanate is preferred.

Examples of the polyisocyanate include hexamethylene diisocyanate, 1,3,3-trimethylhexamethylene diisocyanate, isophorone diisocyanate, 4,4'-dicyclohexylmethane diisocyanate, xylylene diisocyanate, tetramethylxylylene diisocyanate, hydrogenated xylylene diisocyanate, tolylene diisocyanate, diphenylmethane diisocyanate, hydrogenated diphenylmethane diisocyanate, 1,5-naphthalene diisocyanate and tetramethylxylylene diisocyanate. The polyisocyanate may also be used in the form, e.g., of a modified compound such as isocyanurate, allophanate, biuret, carbodiimide or an adduct such as a trimer.

The polyisocyanate may be also used in the form of a compound blocked with a blocking agent. Examples of the blocking agent include acetylacetone, diethyl malonate, dimethylmalonate, 2,4-hexadione, 3,5-heptadione, acetoxime, butanoneoxime, methyl ethyl ketoxime and caprolactam. Of these, methyl ethyl ketoxime and β-diketone such as acetylacetone are preferred.

When the polyisocyanate is a polyisocyanate having an aromatic ring such as xylylene diisocyanate or tetramethylxylylene diisocyanate, the polyisocyanate is advantageously used in the form of a modified compound, an adduct or a prepolymer.

When the polyisocyanate is an aliphatic polyisocyanate, it is advantageously used in the form of a compound blocked with β-diketone. In particular, hexamethylene diisocyanate is advantageous for providing the primer composition of the present invention as a one-pack type composition when a cyclic trimer of the hexamethylene diisocyanate is used in the form of a compound blocked with β-diketone.

The primer composition of the present invention may contain at least one polyol selected from the group consisting of polyester polyol, polyether polyol, acryl polyol and polycarbonate polyol as required. In this case, the amount of the polyol per 1 part by weight of the above bromine compound is 10 parts by weight or less, preferably 0.01 to 3 parts by weight.

The polyester polyol comprises a polybasic acid and a hydroxy compound. Examples of the polybasic acid include organic carboxylic acids such as phthalic acid, isophthalic acid, hydrogenated phthalic acid, adipic acid, linolenic acid dimer and maleic acid. These polybasic acids may be used alone or in combination. Examples of the hydroxy compound include glycols such as ethylene glycol, propylene glycol, butylene glycol, hexylene glycol and diethylene glycol; and tri- or tetraols such as trimethylolpropane, hexantriol, glycerin, trimethylolethane and pentaerythritol. These hydroxy compounds may be used alone or in combination.

The above polyester polyol can be obtained as commercially available products, for example, in the names of DESMOPHEN series (Sumitomo-Bayer Co., Ltd.), NIPPOLAN series (Nippon Polyurethane Industry Co., Ltd.), TAKERAK series (Takeda Chemicals Industries, Ltd.), ADEKA NEW ACE series (Asahi Denka Kogyo K.K.), and VARNOK (Dainippon Ink & Chemicals, Inc.).

The above polyether polyol can be obtained as commercially available products, for example, in the names of ADEKA POLYETHER (Asahi Denka Kogyo K.K.), ACTOCOL (Takeda Chemicals Industries, Ltd.) and PPG-Diol series (Mitsui Toatsu Chemicals, Inc.). The acryl polyol can be obtained as commercially available products, for example, in the names of TAKERAK series (Takeda Chemicals Industries, Ltd.) and ACRYDIC (Dainippon Ink & Chemicals, Inc.).

Further, the polycarbonate polyol can be obtained as commercially available products, for example, in the names of NIPPOLAN No. 980 series (Nippon Polyurethane Industry Co., Ltd.) and CARBODIOL (Toagosei Co., Ltd.).

The primer composition of the present invention may contain the above bromine compound, the polyol optionally contained and the polyisocyanate in an unreacted state as they are, and further, the primer composition of the present invention may contain the above components in the state of a prepolymer obtained by reacting the above components in advance.

When the primer composition contains the above components in an unreacted state, the equivalent amount ratio (NCO/OH) of isocyanate groups (NCO) of the polyisocyanate and hydroxyl groups (OH) of the bromine compound is preferably in the range of from 0.7 to 1.8. When the primer composition contains the other polyol, the equivalent amount ratio (NCO/OH) of isocyanate groups (NCO) of the polyisocyanate and the total hydroxyl groups (OH) of the bromine compound and the polyol is preferably in the range of from 0.7 to 1.8. When the above ratio is smaller than 0.7, the adhesion of a hard coating to an obtained cured primer coating tends to be low. On the other hand, when the above ratio is greater than 1.8, the coating tends to undergo whitening or the adhesion of a hard coating tends to be low.

Further, when the primer composition contains the above components in the state of a prepolymer obtained by reacting them in advance, the equivalent amount ratio (NCO/OH) of isocyanate groups (NCO) of the polyisocyanate and hydroxyl groups (OH) of the bromine compound is preferably in the range of 1 to 5. When the primer composition contains the other polyol, the equivalent amount ratio (NCO/OH) of isocyanate groups (NCO) of the polyisocyanate and the total hydroxyl groups (OH) of the bromine compound and the polyol is preferably in the range of 1 to 5. When the above ratio is less than 1, a reaction product is liable to undergo gelation, it is difficult to obtain the primer composition as a transparent solution, and the adhesion of a hard coating to the cured film tends to be low. On the other hand, when the above ratio is greater than 5, the film tends to undergo whitening.

The primer composition of the present invention is generally provided in a solution state in which it is dissolved in an aprotic polar organic solvent.

The above organic solvent is selected, for example, from the group consisting of a compound formed by converting one terminal OH group of ethylene glycol, diethylene glycol or propylene glycol to a methoxy, ethoxy, propoxy or butoxy group and converting the other terminal OH group to an acetyloxy group, a compound formed by converting each of terminal OH groups of the above glycol to a methoxy, ethoxy, propoxy or butoxy group, and a compound formed by optionally replacing a hydrogen atom of an alicyclic ketone with an alkyl group. These solvents may be used alone or in combination.

Specific examples of the above organic solvent include ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, propylene glycol monobutyl ether acetate, diethylene glycol monomethyl ether acetate, diethylene glycol monoethyl ether acetate, diethylene glycol monopropyl ether acetate, diethylene glycol monobutyl ether acetate, ethylene glycol dimethyl ether, ethylene glycol diethyl ether, ethylene glycol dipropyl ether, ethylene glycol dibutyl ether, diethylene glycol dimethyl ether, diethylene glycol diethyl ether, diethylene glycol dipropyl ether, diethylene glycol dibutyl ether, propylene glycol dimethyl ether, propylene glycol diethyl ether, o-methylcyclohexanone, m-methylcyclohexanone, and p-methylcyclohexanone. Besides these, propylene glycol monomethyl ether may be also used.

The primer composition of the present invention may contain a curing catalyst, metal oxide fine particles, a leveling agent, a lubricity-imparting agent, an antioxidant, a weatherability-imparting agent, an antistatic agent and a bluing agent as required.

The curing catalyst is preferably selected from fatty acid metal salts and amines. The curing catalyst is particularly effective when a polyisocyanate blocked with a blocking agent is used.

Examples of the fatty acid metal salts preferably include salts of metals such as tin, zinc, cobalt, iron, aluminum or the like of a higher fatty acid such as stearic acid or capric acid.

Examples of the amines include aliphatic amines, aromatic amines and aminosilanes such as polymethylenediamine, polyetherdiamine, diethylenetriamine, iminobispropylamine, bishexamethylenetriamine, diethylenetriamine, tetraethylenepentamine, pentaethylenehexamine, dimethylaminopropylamine, aminoethylethanolamine, methyliminobispropylamine, menthanediamine, N-aminomethylpiperazine, 1,3-diaminocyclohexane, isophoronediamine, m-xylenediamine, tetrachloro-p-xylylenediamine, m-phenylenediamine, 4,4'-methylenedianiline, diaminodiphenylsulfone, benzidine, toluidine, diaminodiphenyl ether, 4,4'-thiodianiline, 4,4'-bis(o-toluidine)dianisidine, o-phenylenediamine, 2,4-toluenediamine, methylenebis(o-chloroaniline), diaminoditolylsulfone, bis(3,4-diaminophenyl)sulfone, 2,6-diaminopyridine, 4-chloro-o-phenylenediamine, 4-methoxy-6-methyl-m-phenylenediamine, m-aminobenzylamine, N,N,N',N'-tetramethyl-1,3-butanediamine, N,N,N',N'-tetramethyl-p-phenylenediamine, tetramethylguanidine, triethanolamine, 2-dimethylamino-2-hydroxypropane, N,N'-dimethylpiperazine, N,N'-bis[(2-hydroxy)propyl]piperazine, N-methylmorpholine, hexamethylenetetramine, pyridine, pyrazine, quinoline, benzyldimethylamine, α-methylbenzylamine, 2-(dimethylaminomethyl)phenol, 2,4,6-tris(dimethylaminomethylol)phenol, N-methylpiperazine, pyrrolidine, morpholine, N-β(aminoethyl)γ-aminopropyltrimethoxysilane, γ-aminopropyltrimethoxysilane, γ-aminopropyltriethoxysilane, N-β(aminoethyl)γ-aminopropylmethyldimethoxysilane, γ-aminopropylmethyldimethoxysilane, and γ-aminopropylmethyldiethoxysilane.

Besides the above catalysts, the curing catalyst can be also selected from ammonium acetate, alkyl acetate quaternary ammonium salt, and trifluoroacetic acid, p-toluenesulfonic acid and salts of these.

The metal oxide fine particles are advantageously added for further increasing the refractive index of a coating film formed of the primer composition. The metal oxide fine particles can be preferably selected from Component A used in a hard coating having a high refractive index, to be described later, antimony oxide sol (AMT-130S, Nissan Chemical Industry Co., Ltd.) and tin oxide-tungsten oxide composite oxide (SANCOLLOID HIS-30M, Nissan Chemical Industry Co., Ltd.).

Further, the leveling agent and the lubricity-imparting agent can be selected, for example, from a copolymer from polyoxyalkylene and polydimethylsiloxane, and a copolymer from polyoxyalkylene and fluorocarbon.

These are used in an amount of 0.001 to 10 parts by weight per 100 parts by weight of the total liquid amount.

The primer composition of the present invention is applied to a plastic lens substrate, particularly a plastic lens substrate for various ophthalmic glasses having a refractive index of above 1.50, such as a plastic lens substrate formed of a polyurethane resin, a plastic lens substrate formed of a methacrylic polymer, a plastic lens substrate formed of an acrylic polymer, or a substrate formed of these two materials by, for example, a dip method, a flow method, a spinner method or a spray method and then, the applied composition is cured by heating it at 90 to 120° C. for several hours to about 15 minutes. The thickness of the cured film is preferably 0.4 to 5 µm. When the thickness is smaller than 0.4 µm, the effect on the improvement of impact resistance is low, while when the thickness is greater than 5 µm, the hardness after a hard coating is formed is low.

In a lens obtained by forming a cured coating film of the primer composition of the present invention on a plastic lens substrate, it is preferred to further form a hard coating on the cured coating film.

According to the present invention, therefore, there is further provided a plastic lens comprising a plastic lens substrate having a refractive index of at least 1.50, a cured coating film of the above primer composition of the present invention and a hard coating having a high refractive index in this order.

The hard coating having a high refractive index is preferably formed of the following three components, A, B and C.

Component A: Sol obtained by dispersing fine particles which are fine particles of at least one oxide selected from iron oxide, titanium oxide, cerium oxide, zirconium oxide, antimony oxide, zinc oxide and tin oxide, a mixture of these or a composite oxide of these and which have an average particle diameter in the range of from 1 to 100 nm, in water or other solvent. As the above fine particles, for example, composite oxide particles formed of an iron oxide component, a titanium oxide component and a silica component, or composite oxide particles formed of a cerium oxide (or ceria) component, a titanium oxide component and a silica component are preferred.

When the composite oxide particles are formed of an iron oxide component, a titanium oxide component and a silica component, it is preferable that the weight ratio of $Fe_2O_3/TiO_2$ is in the range of 0.005 to 1.0, and the weight ratio of $SiO_2/(Fe_2O_3+TiO_2)$ is in the range of 0.001 to 1.0, in which the amount of the iron oxide component is calculated as $Fe_2O_3$, the amount of the titanium oxide component is calculated as $TiO_2$, and the amount of the silica component is calculated as $SiO_2$.

When the composite oxide particles are formed of a cerium oxide component, a titanium oxide component and a silica component, it is preferable that the weight ratio of $Ce_2O_3/TiO_2$ is in the range of 0.1 to 1.0, and the weight ratio of $SiO_2/(Ce_2O_3+TiO_2)$ is in the range of 0.05 to 0.5, in which the amount of the cerium oxide component is calculated as $Ce_2O_3$, the amount of the titanium oxide component is calculated as $TiO_2$, and the amount of the silica component is calculated as $SiO_2$.

The above fine particles are preferably surface-treated with an organosilicon compound.

The above organosilicon compound includes a monofunctional silane of the following formula, $R_3SiX$ wherein R is an organic group having an alkyl group, a phenyl group, a vinyl group, a methacryloxy group, a mercapto group, an amino group or an epoxy group and X is a hydrolyzable group, a difunctional silane of the following formula, $R_2SiX_2$ wherein R and X are as defined above, a trifunctional silane of the following formula, $RSiX_3$ wherein R and X are as defined above, and a tetrafunctional silane of the following formula, $SiX_4$ wherein X is as defined above.

Examples of the monofunctional silane include trimethylmethoxysilane, triethylmethoxysilane, trimethylethoxysilane, triethylethoxysilane, triphenylmethoxysilane, diphenylmethylmethoxysilane, phenyldimethylmethoxysilane, phenyldimethylethoxysilane, vinyldimethylmethoxysilane, vinyldimethylethoxysilane, γ-acryloxypropyldimethylmethoxysilane, γ-methacryloxypropyldimethylmethoxysilane, γ-mercaptopropyldimethylmethoxysilane, γ-mercaptopropyldimethylethoxysilane, N-β(aminoethyl)γ-aminopropyldimethylmethoxysilane, γ-aminopropyldimethylmethoxysilane, γ-aminopropyldiethylmethoxysilane, γ-glycidoxypropyldimethylmethoxysilane, γ-glycidoxypropyldimethoxyethoxysilane, and β-(3,4-epoxycyclohexyl)ethyldimethylmethoxysilane.

Examples of the difunctional silane include dimethyldimethoxysilane, diethyldimethoxysilane, dimethyldiethoxysilane, diethyldiethoxysilane, diphenyldimethoxysilane, phenylmethyldimethoxysilane, phenylmethyldiethoxysilane, vinylmethyldimethoxysilane, vinylmethyldiethoxysilane, γ-acryloxypropylmethyldimethoxysilane, γ-methacryloxypropyldimethyldimethoxysilane, γ-mercaptopropylmethyldimethoxysilane, γ-mercaptopropylmethyldiethoxysilane, N-β(aminoethyl)γ-aminopropylmethyldimethoxysilane, γ-aminopropylmethyldimethoxysilane, γ-aminopropylmethyldimethoxysilane, γ-aminopropylmethyldiethoxysilane, γ-glycidoxypropylmethyldimethoxysilane, γ-glycidoxypropylmethoxydiethoxysilane, and β-(3,4-epoxycyclohexyl)ethylmethyldimethoxysilane.

Examples of the trifunctional silane include methyltrimethoxysilane, ethyltrimethoxysilane, methyltriethoxysilane, ethyltriethoxysilane, phenyltrimethoxysilane, phenyltriethoxysilane, vinyltrimethoxysilane, vinyltriethoxysilane, vinyl(β-methoxyethoxy)silane, γ-acryloxypropyltrimethoxysilane, γ-methacryloxypropyltrimethoxysilane, γ-mercaptopropyltrimethoxysilane, γ-mercaptopropyltriethoxysilane, N-β(aminoethyl)γ-aminopropyltrimethoxysilane, γ-aminopropyltrimethoxysilane, γ-aminopropyltriethoxysilane, γ-glycidoxypropyltrimethoxysilane, β-glycidoxypropyltrimethoxysilane, γ-glycidoxypropyltriethoxysilane, β-glycidoxypropyltriethoxysilane, and β-(3,4-epoxycyclohexyl)ethyltrimethoxysilane.

Examples of the tetrafunctional silane include tetraethylorthosilicate and tetramethylorthosilicate.

When the oxide fine particles are surface-treated with the above organosilicon compound, the organosilicon compound may be used as it is or after it is hydrolyzed in advance. The organosilicon compound or its hydrolyzate is used in an amount of 0.01 to 0.15 part by weight based on 1 part by weight of the fine particles. The organosilicon compound or its hydrolyzate is applied to the fine particles after it is dispersed in a dispersing medium.

Examples of the above dispersing medium include methanol, ethanol, isopropyl alcohol, n-butanol, 2-butanol, methyl cellosolve, ethyl cellosolve, propyl cellosolve, butyl cellosolve, ethylene glycol, methyl acetate, ethyl acetate, diethyl ether, tetrahydrofuran, acetone, xylene, N,N-dimethylformamide, methyl ethyl ketone, dichloroethane and toluene.

The sol as Component A can be obtained as a commercially available product, for example, in the name of OPTO-LAKE 1130F-2 (A-8) [iron oxide-titanium oxide-silica composite particles, solid content 30%, methanol dispersion] or OPTOLAKE 1130A (A-8) [cerium oxide-titanium oxide-silica composite particles, solid content 30%, methanol dispersion] supplied by Catalyst & Chemicals Co., Ltd.

Component B: An epoxy-group-containing silicon compound of the following formula, or its partial hydrolyzate,

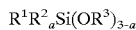

wherein $R^1$ is an epoxy-group-containing group having 2 to 12 carbon atoms, $R^2$ is an alkyl group having 1 to 6 carbon atoms, an alkenyl group, an aryl group, a halogenated alkyl group or a halogenated aryl group, $R^3$ is a hydrogen atom, an alkyl group having 1 to 4 carbon atoms or an acyl group, and a is 0.1 or 2.

Examples of the above epoxy-group-containing silicon compound include γ-glycidoxypropyltrimethoxysilane, β-glycidoxypropyltrimethoxysilane, γ-glycidoxypropyltriethoxysilane, β-glycidoxypropyltriethoxysilane, γ-glycidoxypropylmethyldimethoxysilane, γ-glycidoxypropylmethyldiethoxysilane, and β-(3,4-epoxycyclohexyl)ethyltrimethoxysilane.

Component C: A compound which has a molecule containing only one OH group or SH group, has a molecule main chain containing at least one group of

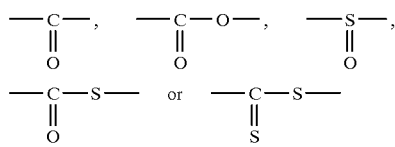

and further has at least one unsaturated group, and which is soluble in water or a lower alcohol having 1 to 4 carbon atoms.

The above compound is, for example, preferably a compound of the following formula,

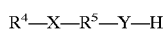

wherein $R^4$ is a monovalent hydrocarbon group having at least one unsaturated group, which may contain an O atom or an S atom as any one of the above groups, $R^5$ is a divalent hydrocarbon group having at least 2 carbon atoms, which may contain an O atom or an S atom as any one of the above groups, and each of X and Y is independently an O atom or an S atom.

Examples of the above compound include poly(ethylene) glycol monomethacrylate, poly(butanediol)monoacrylate, poly(butanediol)monomethacrylate, 1,4-butanediol monovinyl ether, 1,6-hexanedithiol monoacrylate, di(acryloxyethyl) hydroxyethylamine, 2-hydroxy-3-phenoxypropyl acrylate, pentaerythritol triacrylate, 2-hydroxybutyl acrylate, 3-acryloyloxyglycerin monomethacrylate, and 2-hydroxy-1,3-dimethacryloxypropane.

As Component C, the following compounds are preferred.
Preferred is a compound of the following formula (A),

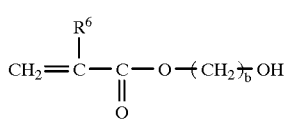

wherein $R^6$ is a hydrogen atom or a methyl group, and b is an integer of 2 to 10, more preferably an integer of 4 to 6.

Examples of the above compound include 4-hydroxybutyl acrylate and 4-hydroxybutyl methacrylate.

Preferred is a compound of the following formula (B),

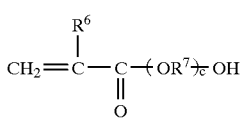

wherein $R^6$ is a hydrogen atom or a methyl group, $R^7$ is $-CH_2CH(CH_3)-$, and c is an integer of 2 to 9, more preferably 2 to 4.

Examples of the above compound include diethylene glycol monoacrylate, tetraethylene glycol monoacrylate, polyethylene glycol monoacrylate, tripropylene glycol monoacrylate, polypropylene glycol monoacrylate, diethylene glycol monomethacrylate, tetraethylene glycol monomethacrylate, polyethylene glycol monomethacrylate, tripropylene glycol monomethacrylate, and polypropylene glycol monomethacrylate.

Preferred is a compound of the following formula (C),

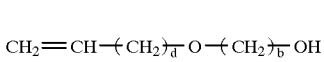

wherein b is an integer of 4 to 10, and d is 0 or 1.

Examples of the above compound include 4-hydroxybutyl allyl ether and 4-hydroxybutyl vinyl ether.

Preferred is a compound of the following formula (D),

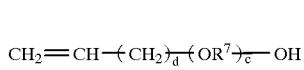

wherein $R^7$ is $-CH_2CH(CH_3)-$, and c is an integer of 2 to 9, and d is 0 or 1.

Examples of the above compound include diethylene glycol monoallyl ether and triethylene glycol monovinyl ether.

When the total amount of the above Components A, B and C is 100 parts by weight, preferably, the amount of Component A is 5 to 80 parts by weight, the amount of Component B is 5 to 60 parts by weight, and the amount of Component C is 10 to 90 parts by weight.

In addition to the above Components A, B and C, the hard coating may contain 0 to 60 parts by weight of an organosilicon compound of the following formula or its partial hydrolyzate as required.

$$R^6_d R^2_e Si(OR^3)_{4-d-e}$$

wherein $R^2$ and $R^3$ are as defined above, $R^6$ is an alkyl group having 1 to 4 carbon atoms, a halogenated alkyl group, an aryl group or halogenated aryl group having 6 to 12 carbon atoms, a methacroxyalkyl group having 5 to 8 carbon atoms, a ureidoalkylene group having 2 to 10 carbon atoms, an aromatic ureidoalkylene group, a halogenated aromatic alkylene group or a mercapto alkylene group, d is 1, 2 or 3, and e is 0, 1 or 2.

Examples of the above organosilicon compound include trimethylmethoxysilane, triethylmethoxysilane, trimethylethoxysilane, triethylethoxysilane, triphenylmethoxysilane, diphenylmethylmethoxysilane, phenyldimethylmethoxysilane, phenyldimethylethoxysilane, vinyldimethylmethoxysilane, vinyldimethylethoxysilane, vinyl(β-methoxyethoxy)silane, β-glycidoxypropyltrimethoxysilane, γ-glycidoxypropyltriethoxysilane, β-glycidoxypropyltriethoxysilane, β-(3,4-epoxycyclohexyl)ethyltrimethoxysilane, tetraethylorthosilicate and tetramethylorthosilicate.

The hard coating formed of the above Components A, B and C preferably has a thickness of 0.8 to 4 μm.

When the thickness is smaller than 0.8 μm, the hardness of the hard coating is low, while when it is greater than 4 μm, the hard coating is liable to undergo cracking.

When the hard coating is applied, it is effective for improving the adhesion of the hard coating to subject the lens substrate to pretreatment such as alkali treatment, acid treatment, plasma treatment, corona treatment or flame treatment.

Further, the hard coating may be provided with a monolayered or multi-layered anti-reflection film of an inorganic material thereon. It serves to decrease reflection, improve transmittance and improve weatherability.

The anti-reflection film of an inorganic material is formed, as a thin film, from SiO, $SiO_2$, $Si_3N_4$, $TiO_2$, $ZrO_2$, $Al_2O_3$, $MgF_2$, $Ta_2O_5$ or the like by a vacuum vapor deposition method.

EXAMPLES

The present invention will be explained in detail hereinafter, while the present invention shall not be limited by these Examples.

Synthesis of blocked isocyanate

Example 1-1

Xylylene diisocyanate (TAKENATE 500, trade name, supplied by Takeda Chemicals Industries, Ltd.) was dissolved in cyclohexanone, and while the mixture was stirred at 40° C., a small amount of dibutyltin dilaurate as a catalyst was added thereto. Then, while an absorption caused by NCO was measured by IR measurement, butanoneoxime was added little by little until the absorption ascribed to NCO was not found. The resultant solution was adjusted so as to have a non-volatile content of 70%, and this solution was used as Liquid A.

Example 1-2

A blocked isocyanate solution was obtained in the same manner as in Example 1-1 except that the xylylene diisocyanate was replaced with tetramethylxylylene diisocyanate. This solution was used as Liquid B.

Example 1-3

Trimethylolpropane was dissolved in cyclohexanone, and xylylene diisocynate in an amount three times of trimethylolpropane in molar ratio was added thereto, to give a trimer. Then, a solution of a blocked isocyanate of the trimer was obtained in the same manner as in Example 1-1. This solution was used as Liquid C.

Example 1-4

A blocked isocyanate solution was obtained in the same manner as in Example 1-3 except that the xylylene diisocyanate was replaced with tetramethylxylylene diisocyanate. This solution was used as Liquid D.

Example 1-5

A solution of a blocked isocyanate of a tetramer was obtained in the same manner as in Example 1-3 except that pentaerythritol was dissolved in cyclohexanone and that xylylene diisocyanate in an amount four times of pentaerythritol in molar ratio was added thereto. This solution was used as Liquid E.

Preparation of Primer

Example 2-1

134 Grams of a compound having the general formula (A) in which R was a 3-tribromophenoxy-2-hydroxypropyl group and having a molecular weight of about 3,000 (trade name PRATHERM EC-30, supplied by Dainippon Ink & Chemicals, Inc.), 36 g of a polyester polyol (trade name ADEKA New Ace YG-240, Asahi Denka Kogyo K.K.), 103 g of a polyisocyanate (trade name CORONATE 2513, supplied by Nippon Polyurethane Industry Co., Ltd.) and 724 g of propylene glycol monomethyl ether acetate as a solvent were mixed, and the mixture was fully stirred until a homogeneous state was obtained. As a flow controlling agent, 0.3 g of a fluorine-containing surfactant (trade name FLUORAD FC430, supplied by 3M Co., Ltd.) was added and further stirred thereby to give a homogeneous mixture solution (NCO:OH=1:1, nonvolatile content 20%). This solution was used as a primer liquid 1. A cured coating film from this liquid had a refractive index of 1.581.

Example 2-2

A primer liquid 2 (NCO:OH=1:1, nonvolatile content 20%) was obtained in the same manner as in Example 2-1 except that there were used 84 g of PRATHERM EC-30, 84 g of a polyester polyol (trade name ADEKA New Ace YG-226, Asahi Denka Kogyo K.K.), 109 g of a polyisocyanate (trade name LS-2759, Sumitomo-Bayer Co., Ltd.) and 718 g of propylene glycol monomethyl ether acetate. A cured coating film from the above liquid had a refractive index of 1.556.

Example 2-3

A primer liquid 3 (NCO:OH=1:1, nonvolatile content 20%) was obtained in the same manner as in Example 2-1 except that there were used 66 g of a compound of the general formula (B) in which $X=CH_2CH_2O$ and $p=q=1$ (trade name FIREGUARD FG-3600, supplied by Teijin Chemicals Ltd.), 44 g of YG-240, 120 g of LS-2759 and 770 g of propylene glycol monomethyl ether acetate. A cured coating film from the above liquid had a refractive index of 1.552.

Example 2-4

A primer liquid 4 (NCO:OH=1:1, nonvolatile content 20%) was obtained in the same manner as in Example 2-1 except that there were used 76 g of FIREGUARD FG-3600, 19 g of a polyester polyol (trade name ADEKA New Ace YG-510, Asahi Denka Kogyo K.K.), 131 g of CORONATE 2513 and 774 g of propylene glycol monomethyl ether acetate. A cured coating film from the above liquid had a refractive index of 1.549.

Example 2-5

A primer liquid 5 (NCO:OH=1:1, nonvolatile content 20%) was obtained in the same manner as in Example 2-1 except that there were used 94 g of FIREGUARD FG-3600, 141 g of LS-2759 and 764 g propylene glycol monomethyl ether acetate. A cured coating film from the above liquid had a refractive index of 1.579.

Example 2-6

A primer liquid 6 (NCO:OH=1:1, nonvolatile content 20%) was obtained in the same manner as in Example 2-1 except that there were used 104 g of a compound having the general formula (A) in which R was 3-tribromophenoxy-2-hydroxypropyl group and having a molecular weight of about 2,000 (trade name PRATHERM EC-20, supplied by Dainippon Ink & Chemicals, Inc.), 26 g of a polycarbonate polyol (trade name NIPPOLAN 983, supplied by Nippon Polyurethane Industry Co., Ltd.), 88 g of CORONATE 2513 and 782 g of cyclohexanone. A cured coating film from the above liquid had a refractive index of 1.580.

Example 2-7

A primer liquid 7 (NCO:OH=1:1, nonvolatile content 30%) was obtained in the same manner as in Example 2-1 except that there were used 171 g of PRATHERM EC-30, 44 g of YG-240, 111 g of a polyisocyanate (trade name D-110N, supplied by Takeda Chemicals Industries, Ltd.) and 671 g of propylene glycol monomethyl ether acetate. A cured coating film from the above liquid had a refractive index of 1.591.

Example 2-8

A primer liquid 8 (NCO:OH=1:1, nonvolatile content 20%) was obtained in the same manner as in Example 2-1 except that there were used 108 g of PRATHERM EC-30, 27 g of YG-240, 85 g of a polyisocyanate (trade name D-180N, supplied by Takeda Chemicals Industries, Ltd.) and 777 g of propylene glycol monomethyl ether acetate. A cured coating film from the above liquid had a refractive index of 1.588.

Example 2-9

A primer liquid 9 (NCO:OH=3:2, nonvolatile content 20%) was obtained in the same manner as in Example 2-1 except that there were used 102 g of PRATHERM EC-20, 26 g of YG-240, 100 g of D-100N and 769 g of cyclohexanone. A cured coating film from the above liquid had a refractive index of 1.590.

Example 2-10

A primer liquid 10 (NCO:OH=1:1, nonvolatile content 20%) was obtained in the same manner as in Example 2-1 except that there were used 104 g of a compound having the general formula (A) in which R was 3-tribromophenoxy-2-hydroxypropyl group and having a molecular weight of about 1,400 (trade name PRATHERM EC-14, supplied by Dainippon Ink & Chemicals, Inc.), 26 g of YG-510, 94 g of D-110N and 776 g of ethylene glycol dimethyl ether. A cured coating film from the above liquid had a refractive index of 1.597.

Example 2-11

A primer liquid 11 (NCO:OH=1:1, nonvolatile content 20%) was obtained in the same manner as in Example 2-1 except that there were used 110 g of PRATHERM EC-30, 28 g of NIPPOLAN 983, 83 g of D-110N and 776 g of ethylene glycol monomethyl ether acetate. A cured coating film from the above liquid had a refractive index of 1.590.

Example 2-12

A primer liquid 12 (NCO:OH=1:1, nonvolatile content 20%) was obtained in the same manner as in Example 2-1 except that there were used 92 g of FIREGUARD FG-3600, 23 g of YG-240, 113 g of D-110N and 772 g of diethylene glycol dimethyl ether. A cured coating film from the above liquid had a refractive index of 1.584.

Example 2-13

A primer liquid 13 (NCO:OH=1:1, nonvolatile content 15%) was obtained in the same manner as in Example 2-1 except that there were used 81 g of FIREGUARD FG-3600, 92 g of D-110N and 824 g of diethylene glycol dimethyl ether. A cured coating film from the above liquid had a refractive index of 1.590.

Example 2-14

A primer liquid 12 (NCO:OH=1:1, nonvolatile content 20%) was obtained in the same manner as in Example 2-1 except that there were used 46 g of EC-20, 46 g of FIREGUARD FG-3600, 23 g of YG-510, 112 g of D-110N and 773 g of diethylene glycol dimethyl ether. A cured coating film from the above liquid had a refractive index of 1.588.

Example 2-15

138 Grams of PRATHERM EC-30, 43 g of a polyester polyol (trade name DESMOPHEN 670-80B, supplied by Sumitomo-Bayer Co., Ltd.) and 39 g of Liquid A were dissolved in 777 g of diethylene glycol dimethyl ether to give a homogeneous solution. As a curing catalyst, further, 5 g of an organotin-containing compound (trade name SCAT-2L, Sankyo Organic Chemicals Co., Ltd.) and 0.4 g of FC430 were added, and the resultant solution was used as a primer liquid 15 (NCO:OH=1:1, nonvolatile content 20%). A cured coating film from the above liquid had a refractive index of 1.604.

Example 2-16

A primer liquid 16 (NCO:OH=1:1, nonvolatile content 20%) was obtained in the same manner as in Example 2-15 except that there were used 124 g of PRATHERM EC-30, 31 g of YG-240, 64 g of Liquid B and 776 g of diethylene glycol dimethyl ether. A cured coating film from the above liquid had a refractive index of 1.605.

Example 2-17

A primer liquid 17 (NCO:OH=1:1, nonvolatile content 20%) was obtained in the same manner as in Example 2-15 except that there were used 97 g of PRATHERM EC-20, 24 g of YG-510, 113 g of Liquid C and 761 g of diethylene glycol dimethyl ether. A cured coating film from the above liquid had a refractive index of 1.593.

Example 2-18

A primer liquid 18 (NCO:OH=1:1, nonvolatile content 20%) was obtained in the same manner as in Example 2-15 except that there were used 107 g of PRATHERM EC-14, 27 g of YG-240, 95 g of Liquid D and 766 g of cyclohexanone. A cured coating film from the above liquid had a refractive index of 1.595.

Example 2-19

A primer liquid 19 (NCO:OH=1:1, nonvolatile content 20%) was obtained in the same manner as in Example 2-15 except that there were used 110 g of PRATHERM EC-20, 27 g of YG-510, 90 g of Liquid E and 768 g of diethylene glycol dimethyl ether. A cured coating film from the above liquid had a refractive index of 1.595.

Example 2-20

A primer liquid 20 (NCO:OH=1:1, nonvolatile content 20%) was obtained in the same manner as in Example 2-15 except that there were used 127 g of a compound having the general formula (A) in which R is a glycidyl group and having a molecular weight of about 2,000 (trade name PRATHERM EP-20, supplied by Dainippon Ink & Chemicals, Inc.), 32 g of YG-240, 58 g of Liquid C and 779 g of cyclohexanone. A cured coating film from the above liquid had a refractive index of 1.593.

Example 2-21

A primer liquid 21 (NCO:OH=1:1, nonvolatile content 20%) was obtained in the same manner as in Example 2-15 except that there were used 115 g of PRATHERM EC-30, 29 g of NIPPOLAN 983, 80 g of Liquid C and 773 g of diethylene glycol dimethyl ether. A cured coating film from the above liquid had a refractive index of 1.592.

Example 2-22

A primer liquid 22 (NCO:OH=3:2, nonvolatile content 30%) was obtained in the same manner as in Example 2-15 except that there were used 122 g of PRATHERM EC-20, 30 g of YG-510, 213 g of Liquid C and 630 g of diethylene glycol dimethyl ether. A cured coating film from the above liquid had a refractive index of 1.590.

Example 2-23

A primer liquid 23 (NCO:OH=1:1, nonvolatile content 20%) was obtained in the same manner as in Example 2-15 except that there were used 77 g of FIREGUARD FG-3600, 19 g of YG-510, 147 g of Liquid C and 752 g of diethylene glycol dimethyl ether. A cured coating film from the above liquid had a refractive index of 1.583.

Example 2-24

A primer liquid 24 (NCO:OH=3:2, nonvolatile content 20%) was obtained in the same manner as in Example 2-15 except that there were used 67 g of FIREGUARD FG-3600, 17 g of YG-240, 156 g of Liquid C and 755 g of diethylene glycol dimethyl ether. A cured coating film from the above liquid had a refractive index of 1.580.

Example 2-25

A primer liquid 25 (NCO:OH=3:4, nonvolatile content 20%) was obtained in the same manner as in Example 2-15 except that there were used 88 g of FIREGUARD FG-3600, 22 g of YG-510, 113 g of Liquid C and 772 g of diethylene glycol dimethyl ether. A cured coating film from the above liquid had a refractive index of 1.588.

Example 2-26

A primer liquid 26 (NCO:OH=1:1, nonvolatile content 30%) was obtained in the same manner as in Example 2-15 except that there were used 125 g of FIREGUARD FG-3600, 32 g of NIPPOLAN 983, 207 g of Liquid C and 631 g of diethylene glycol dimethyl ether. A cured coating film from the above liquid had a refractive index of 1.582.

Example 2-27

A primer liquid 27 (NCO:OH=1:1, nonvolatile content 20%) was obtained in the same manner as in Example 2-15 except that there were used 88 g of FIREGUARD FG-3600, 10g of YG-510, 146 g of Liquid C and 751 g of diethylene glycol dimethyl ether. A cured coating film from the above liquid had a refractive index of 1.591.

Example 2-28

A primer liquid 28 (NCO:OH=1:1, nonvolatile content 20%) was obtained in the same manner as in Example 2-15 except that there were used 99 g of FIREGUARD FG-3600, 144 g of Liquid C and 752 g of diethylene glycol dimethyl ether. A cured coating film from the above liquid had a refractive index of 1.598.

Example 2-29

A primer liquid 29 (NCO:OH=3:2, nonvolatile content 10%) was obtained in the same manner as in Example 2-15 except that there were used 41 g of FIREGUARD FG-3600, 84 g of Liquid C and 870 g of diethylene glycol dimethyl ether. A cured coating film from the above liquid had a refractive index of 1.594.

Example 2-30

A primer liquid 30 (NCO:OH=1:1, nonvolatile content 20%) was obtained in the same manner as in Example 2-15 except that there were used 43 g of EC-20, 43 g of FIREGUARD FG-3600, 21 g of YG-510, 132 g of Liquid C and 756 g of diethylene glycol dimethyl ether. A cured coating film from the above liquid had a refractive index of 1.582.

Example 2-31

81 Grams of PRATHERM EC-14, 121 g of YG-510 and 98 g of xylylene diisocyanate (NCO:OH=2:1) were allowed to react in a cyclohexanone solvent. Further, unreacted isocyanate groups were blocked with butanoneoxime in the same manner as in Example 1-1. Then, the resultant solution was diluted with cyclohexanone so as to have a nonvolatile content of 25%, and 1,000 g of the solution was weighed out. Then, 10 g of SCAT-2L and 0.5 g of FC-430 were added to the solution to give a primer liquid 31. A cured coating film from this liquid had a refractive index of 1.560.

Example 2-32

A primer liquid 32 was obtained in the same manner as in Example 2-31 except that there were used 97 g of PRATHERM EC-14, 145 g of YG-240 and 58 g of xylylene diisocyanate (NCO:OH=5:2) and that the nonvolatile content was adjusted to 30%. A cured coating film from the above liquid had a refractive index of 1.551.

Example 2-33

A primer liquid 33 was obtained in the same manner as in Example 2-31 except that there were used 113 g of PRATHERM EC-14, 113 g of YG-510 and 75 g of xylylene diisocyanate (NCO:OH=3:2) and that the nonvolatile content was adjusted to 30%. A cured coating film from this liquid had a refractive index of 1.555.

Example 2-34

A primer liquid 34 was obtained in the same manner as in Example 2-31 except that there were used 212 g of PRATHERM EC-14, 53 g of YG-510 and 86 g of xylylene diisocyanate (NCO:OH=2:1) and that the nonvolatile content was adjusted to 33%. A cured coating film from the above liquid had a refractive index of 1.600.

Example 2-35

A primer liquid 35 was obtained in the same manner as in Example 2-31 except that there were used 228 g of PRATHERM EC-14, 57 g of YG-240 and 65 g of xylylene diisocyanate (NCO:OH=2:1). A cured coating film from the above liquid had a refractive index of 1.602.

Example 2-36

A primer liquid 36 was obtained in the same manner as in Example 2-31 except that there were used 193 g of PRATHERM EC-14, 48 g of YG-240 and 82 g of xylylene diisocyanate (NCO:OH=3:1). A cured coating film from the above liquid had a refractive index of 1.599.

Example 2-37

A primer liquid 37 was obtained in the same manner as in Example 2-31 except that there were used 154 g of PRATHERM EC-14, 66 g of YG-510 and 80 g of xylylene diisocyanate (NCO:OH=3:1). A cured coating film from the above liquid had a refractive index of 1.590.

Example 2-38

A primer liquid 38 was obtained in the same manner as in Example 2-31 except that there were used 157 g of FIREGUARD FG-3600, 39 g of YG-510 and 104 g of xylylene diisocyanate (NCO:OH=2:1). A cured coating film from the above liquid had a refractive index of 1.592.

Example 2-39

A primer liquid 39 was obtained in the same manner as in Example 2-31 except that there were used 172 g of FIREGUARD FG-3600, 43 g of YG-510 and 86 g of xylylene diisocyanate (NCO:OH=3:2). A cured coating film from the above liquid had a refractive index of 1.590.

Example 2-40

A primer liquid 40 was obtained in the same manner as in Example 2-31 except that there were used 145 g of FIREGUARD FG-3600, 36 g of YG-240 and 119 g of xylylene diisocyanate (NCO:OH=3:1). A cured coating film from the above liquid had a refractive index of 1.589.

Example 2-41

189 Grams of FIREGUARD FG-3600, 47 g of YG-510 and 63 g of xylylene diisocyanate (NCO:OH=1:1) were allowed to react in a cyclohexanone solvent. Then, the resultant solution was diluted with cyclohexanone so as to have a nonvolatile content of 20%, and 1,000 g of the solution was weighed out. Then, 0.5 g of FC-430 were added to the solution to give a primer liquid 41. A cured coating film from this liquid had a refractive index of 1.592.

Example 2-42

A primer liquid 42 was obtained in the same manner as in Example 2-31 except that there were used 84 g of EC-14, 84 g of FIREGUARD FG-3600, 42 g of YG-510 and 90 g of xylylene diisocyanate (NCO:OH=2:1). A cured coating film from the above liquid had a refractive index of 1.590.

Example 2-43

281 Grams of PRATHERM EC-14, 69 g of xylylene diisocyanate (NCO:OH=2:1) were allowed to react in a cyclohexanone solvent. Further, unreacted isocyanate groups were blocked with butanoneoxime in the same manner as in Example 1-1. The resultant solution was used as Liquid F. Then, 403 g of Liquid F and 59 g of YG-510 were mixed with 523 g of cyclohexanone. Then, 10 g of SCAT-2L and 0.5 g of FC-430 were added, and the mixture was stirred to give a primer liquid 43. A cured coating film from this liquid had a refractive index of 1.591.

Example 2-44

A primer liquid 44 was obtained in the same manner as in Example 2-43 except that 508 g of Liquid F and 22 g of YG-510 were mixed with 455 g of cyclohexanone. A cured coating film from this liquid had a refractive index of 1.594.

Example 2-45

A primer liquid 45 was obtained in the same manner as in Example 2-43 except that 490 g of Liquid F and 29 g of YG-240 were mixed with 469 g of cyclohexanone. A cured coating film from this liquid had a refractive index of 1.593.

Example 2-46

220 Grams of PRATHERM EC-14 and 80 g of xylylene diisocyanate (NCO:OH=3:1) were allowed to react in a diethylene glycol dimethyl ether solvent. Further, unreacted isocyanate groups were blocked with butanoneoxime in the same manner as in Example 1-1. The resultant solution was used as Liquid G. Then, a primer liquid 46 was obtained in the same manner as in Example 2-43 except that 583 g of Liquid G and 25 g of YG-510 were mixed with 392 g of diethylene glycol dimethyl ether. A cured coating film from this liquid had a refractive index of 1.590.

Example 2-47

A primer liquid 47 was obtained in the same manner as in Example 2-43 except that 220 g of Liquid G and 25 g of YG-240 were mixed with 392 g of diethylene glycol dimethyl ether. A cured coating film from this liquid had a refractive index of 1.590.

Example 2-48

199 Grams of FIREGUARD FG-3600 and 101 g of xylylene diisocyanate (NCO:OH=2:1) were allowed to react in a propylene glycol methyl ether acetate solvent. Further, unreacted isocyanate groups were blocked with butanoneoxime in the same manner as in Example 1-1. The resultant solution was used as Liquid H. Then, a primer liquid 48 was obtained in the same manner as in Example 2-43 except that 567 g of Liquid H and 30 g of YG-510 were mixed with 393 g of propylene glycol methyl ether acetate. A cured coating film from this liquid had a refractive index of 1.589.

Example 2-49

217 Grams of FIREGUARD FG-3600 and 83 g of xylylene diisocyanate (NCO:OH=3:2) were allowed to react in a diethylene glycol dimethyl ether solvent. Further, unreacted isocyanate groups were blocked with butanoneoxime in the same manner as in Example 1-1. The resultant solution was used as Liquid I. Then, a primer liquid 49 was obtained in the same manner as in Example 2-43 except that 600 g of Liquid I and 20 g of YG-240 were mixed with 370 g of diethylene glycol dimethyl ether. A cured coating film from this liquid had a refractive index of 1.591.

Example 2-50

240 Grams of FIREGUARD FG-3600 and 60 g of xylylene diisocyanate (NCO:HO =1:1) were allowed to react in a cyclohexanone solvent. Then, the resultant reaction mixture was diluted with cyclohexanone so as to have a nonvolatile content of 20%. Then, 1,000 g of the diluted solution was weighed out, and 0.5 g of FC-430 was added to the diluted solution to give a primer liquid 50. A cured coating film from this liquid had a refractive index of 1.608.

Example 2-51

The same solution as that obtained in Example 2-5 was diluted with propylene glycol methyl ether so as to have a nonvolatile content of 15%, and 1,000 g of the diluted solution was weighed out. Then, 100 g of a composite metal oxide sol comprising $TiO_2$—$Fe_2O_3$—$SiO_2$ (solid content 30%, methanol dispersion sol, trade name OPTOLAKE 1130F-2(A-8), supplied by Catalysts & Chemicals Industries Co., Ltd.) was added to the solution to give a primer liquid 51. A cured coating film from this liquid had a refractive index of 1.640.

Example 2-52

The same solution as that obtained in Example 2-23 was diluted with diethylene glycol dimethyl ether so as to have a nonvolatile content of 15%, and 1,000 g of the diluted solution was weighed out. Then, 110 g of a composite metal oxide sol comprising $TiO_2$—$Fe_2O_3$—$SiO_2$ (solid content 30%, methanol dispersion sol, trade name OPTOLAKE 1130F-2(A-8), supplied by Catalysts & Chemicals Industries Co., Ltd.) was added to the diluted solution to give a primer liquid 52. A cured coating film from this liquid had a refractive index of 1.641.

Example 2-53

The same solution as that obtained in Example 2-34 was diluted with cyclohexanone so as to have a nonvolatile content of 15%, and 1,000 g of the diluted solution was weighed out. Then, 90 g of a composite metal oxide sol comprising $TiO_2$—$Fe_2O_3$—$SiO_2$ (solid content 30%, methanol dispersion sol, trade name OPTOLAKE 1130F-2(A-8), supplied by Catalysts & Chemicals Industries Co., Ltd.) was added to the diluted solution to give a primer liquid 53. A cured coating film from this liquid had a refractive index of 1.640.

Example 2-54

The same solution as that obtained in Example 2-38 was diluted with cyclohexanone so as to have a nonvolatile content of 15%, and 1,000 g of the diluted solution was weighed out. Then, 100 g of a composite metal oxide sol comprising $TiO_2$—$Fe_2O_3$—$SiO_2$ (solid content 30%, methanol dispersion sol, trade name OPTOLAKE 1130F-2(A-8), supplied by Catalysts & Chemicals Industries Co., Ltd.) was added to the diluted solution to give a primer liquid 54. A cured coating film from this liquid had a refractive index of 1.642.

Example 2-55

The same solution as that obtained in Example 2-41 was diluted with cyclohexanone so as to have a nonvolatile content of 15%, and 1,000 g of the diluted solution was weighed out. Then, 100 g of a composite metal oxide sol comprising $TiO_2$—$Fe_2O_3$—$SiO_2$ (solid content 30%, methanol dispersion sol, trade name OPTOLAKE 1130F-2(A-8), supplied by Catalysts & Chemicals Industries Co., Ltd.) was added to the diluted solution to give a primer liquid 55. A cured coating film from this liquid had a refractive index of 1.645.

Example 2-56

The same solution as that obtained in Example 2-50 was diluted with cyclohexanone so as to have a nonvolatile content of 15%, and 1,000 g of the diluted solution was weighed out. Then, 70 g of a composite metal oxide sol comprising $TiO_2$—$Fe_2O_3$—$SiO_2$ (solid content 30%, methanol dispersion sol, trade name OPTOLAKE 1130F-2(A-8), supplied by Catalysts & Chemicals Industries Co., Ltd.) was added to the diluted solution to give a primer liquid 56. A cured coating film from this liquid had a refractive index of 1.643.

Preparation of hard coating

Example 3-1

210 Grams of OPTOLAKE 1130F-2(A-8) was weighed out and placed in a flask, and 150 g of distilled water was added thereto with stirring. Then, 278 g of γ-glycidoxypropyltrimethoxysilane was gradually added, and after the completion of the addition, the mixture was further stirred for 2 hours.

Thereafter, while the mixture was stirred, 316 g of isopropyl alcohol was added, and then 40 g of polyethylene glycol monomethacrylic acid ester (trade name PE200, supplied by Nippon Oil & Fats Co., Ltd.) was added. Further, 6 g of acetylacetone aluminum as a curing catalyst and 0.4 g of a silicone surfactant (trade name L-7001, supplied by Nippon Unicar Company Limited) as a flow controlling agent were added, and the mixture was stirred for 1 hour. The mixture was aged at room temperature for 48 hours to give a hard coating liquid 1. A cured coating film from this liquid had a refractive index of 1.545.

Example 3-2

A hard coating liquid 2 was obtained in the same manner as in Example 3-1 except that there were used 330 g of OPTOLAKE 1130F-2(A-8), 182 g of γ-glycidoxypropyltrimethoxysilane, 65 g of methyltrimethoxysilane and 227 g of isopropyl alcohol. A cured coating film from this liquid had a refractive index of 1.588.

Example 3-3

A hard coating liquid 3 was obtained in the same manner as in Example 3-1 except that there were used 433 g of OPTOLAKE 1130F-2(A-8), 184 g of γ-glycidoxypropyltrimethoxysilane, 216 g of isopropyl alcohol. A cured coating film from this liquid had a refractive index of 1.640.

Comparative Example 1

A primer liquid 57 (NCO:OH=2:3, nonvolatile content 20%) was obtained in the same manner as in Example 2-15 except that there were used 120 g of PRATHERM EC-20, 30 g of YG-510, 69 g of Liquid C and 766 g of diethylene glycol dimethyl ether. A cured coating film from this liquid had a refractive index of 1.596.

Comparative Example 2

A primer liquid 58 (NCO:OH=2:1, nonvolatile content 20%) was obtained in the same manner as in Example 2-15 except that there were used 69 g of PRATHERM EC-20, 17 g of YG-510, 159 g of Liquid C and 740 g of diethylene glycol dimethyl ether. A cured coating film from this liquid had a refractive index of 1.585.

Comparative Example 3

A primer liquid 59 (NCO:OH=1:1, nonvolatile content 20%) was obtained in the same manner as in Example 2-15 except that there were used 120 g of PRATHERM EC-20, 115 g of Liquid C and 753 g of diethylene glycol dimethyl ether. A cured coating film from this liquid had a refractive index of 1.597.

Comparative Example 4

A primer liquid 60 (NCO:OH=1:1, nonvolatile content 40%) was obtained in the same manner as in Example 2-15 except that there were used 194 g of PRATHERM EC-20, 48 g of YG-510, 226 g of Liquid C and 527 g of diethylene glycol dimethyl ether. A cured coating film from this liquid had a refractive index of 1.593.

Comparative Example 5

A primer liquid 61 (NCO:OH=1:1, nonvolatile content 5%) was obtained in the same manner as in Example 2-15 except that there were used 25 g of FIREGUARD FG-3600, 36 g of Liquid C and 930 g of diethylene glycol dimethyl ether. A cured coating film from this liquid had a refractive index of 1.598.

Comparative Example 6

A primer liquid 62 was obtained in the same manner as in Example 2-31 except that there were used 250 g of PRATHERM EC-14, 62 g of YG-510 and 38 g of xylylene diisocyanate (NCO:OH=2:3). A cured coating film from this liquid had a refractive index of 1.590.

Comparative Example 7

An attempt was made to react 241 g of PRATHERM EC-14, 60 g of YG-510 and 49 g of xylylene diisocyanate (NCO:OH=1:1) for forming a polymer. However, the mixture underwent gelation.

Comparative Example 8

100 Grams of D-181N, 108 g of NIPPOLAN 983 and 2 g of zinc octylate as a curing catalyst were dissolved in 650 g of ethyl acetate, and the mixture was fully stirred until a homogeneous state was obtained. 1 Gram of a fluorine-containing surfactant (trade name FLUORAD FC431, supplied by 3M Co., Ltd.) as a flow controlling agent was added, and the mixture was stirred thereby to give a homogeneous mixture solution. This solution was used as a primer liquid 63. A cured coating film from this liquid had a refractive index of 1.505.

Comparative Example 9

100 Grams of a polyisocyanate (trade name CORONATE 2507, supplied by Nippon Polyurethane Industry Co., Ltd.) was dissolved in 300 g of methanol and 300 g of methyl ethyl ketone. Then, when 110 g of pentaerythritol tetrakis (3-mercaptopropionic acid) was added thereto, a white precipitate was formed and no homogeneous solution was obtained.

Comparative Example 10

90 Grams of D110N and 50 g of NIPPOLAN 983 were dissolved in 50 g of ethyl acetate and 200 g of methyl ethyl ketone, and the mixture was stirred. Then, when 40 g of pentaerythritol tetrakis(3-mercaptopropionic acid) was added thereto, a white precipitate was formed and no homogeneous solution was obtained.

Comparative Example 11

72 Grams of DESMOPHEN 670-80B and 59.3 g of CORONATE 2507 were dissolved in 359 g of cellosolve acetate and 359 g of methanol. To the mixture was added 150 g of OPTOLAKE 1130F-2(A-8) and further, 1 g of dibutyltin dilaurate as a curing catalyst was added. The mixture was stirred to give a homogeneous solution. This solution was used as a primer liquid 64. A cured coating film from this liquid had a refractive index of 1.588.

Comparative Example 12

200 Grams of OPTOLAKE 1130F-2(A-8) was added to 1,000 g of an aqueous emulsion polyurethane (trade name SUPERFLEX 150, supplied by Dai-ichi Kogyo Seiyaku Co., Ltd.), and a hydrolyzate prepared by hydrolyzing 80 parts of γ-glycidoxypropyltrimethoxysilane with 50 parts of distilled water was mixed. The mixture was stirred to give a homogenous mixture solution. This solution was used as a primer liquid 65. A cured coating film from this liquid had a refractive index of 1.586.

Preparation of coated lens

Example 4

The primer liquids 1 to 65 were applied to various lens substrates and cured, and then the hard coating liquids obtained in Example 3 were applied thereto and cured. Further, each of the hard coating liquids 1 to 3 alone was also applied and cured. Tables 1 to 3 show the evaluations of performances of the obtained lenses.

TABLE 1

Primer liquid Nos. and various physical properties

| No. | Primer Liquid No. | Primer Film thickness (μm) | Hard coating Liquid No. | Hard coating Film thickness (μm) | Lens substrate | Appearance | Adhesion (%) | SW hardness | Dyeability (%) | Interference fringes |
|---|---|---|---|---|---|---|---|---|---|---|
| 1  | 1  | 1.3 | 2 | 2.0 | A | Excellent | 100 | 4 | 36 | No |
| 2  | 2  | 1.3 | 1 | 2.0 | E | Excellent | 100 | 4 | 28 | No |
| 3  | 3  | 1.3 | 1 | 2.0 | F | Excellent | 100 | 4 | 35 | No |
| 4  | 4  | 1.3 | 1 | 2.0 | G | Excellent | 100 | 4 | 29 | No |
| 5  | 5  | 1.3 | 2 | 2.0 | A | Excellent | 100 | 4 | 35 | No |
| 6  | 6  | 1.4 | 2 | 2.0 | A | Excellent | 100 | 4 | 36 | No |
| 7  | 7  | 2.2 | 2 | 2.0 | A | Excellent | 100 | 4 | 37 | No |
| 8  | 8  | 1.3 | 2 | 2.0 | A | Excellent | 100 | 4 | 36 | No |
| 9  | 9  | 1.2 | 2 | 2.0 | A | Excellent | 100 | 4 | 38 | No |
| 10 | 10 | 1.2 | 2 | 2.0 | A | Excellent | 100 | 4 | 39 | No |
| 11 | 11 | 1.3 | 2 | 2.0 | A | Excellent | 100 | 4 | 39 | No |
| 12 | 12 | 1.3 | 2 | 2.0 | A | Excellent | 100 | 4 | 41 | No |
| 13 | 13 | 0.8 | 2 | 2.0 | A | Excellent | 100 | 4 | 37 | No |
| 14 | 14 | 1.3 | 2 | 2.0 | A | Excellent | 100 | 4 | 40 | No |
| 15 | 15 | 1.4 | 2 | 2.0 | A | Excellent | 100 | 4 | 37 | No |
| 16 | 16 | 1.2 | 2 | 2.0 | A | Excellent | 100 | 4 | 37 | No |
| 17 | 17 | 1.4 | 2 | 2.0 | A | Excellent | 100 | 4 | 38 | No |
| 18 | 18 | 1.3 | 2 | 2.0 | A | Excellent | 100 | 4 | 39 | No |
| 19 | 19 | 1.2 | 2 | 2.0 | A | Excellent | 100 | 4 | 36 | No |
| 20 | 20 | 1.3 | 2 | 2.0 | A | Excellent | 100 | 4 | 38 | No |
| 21 | 21 | 1.3 | 2 | 2.0 | A | Excellent | 100 | 4 | 39 | No |
| 22 | 22 | 2.3 | 2 | 2.0 | A | Excellent | 100 | 4 | 37 | No |
| 23 | 23 | 1.3 | 2 | 2.0 | A | Excellent | 100 | 4 | 41 | No |
| 24 | 24 | 1.4 | 2 | 2.0 | B | Excellent | 100 | 4 | 42 | No |
| 25 | 25 | 1.3 | 2 | 2.0 | C | Excellent | 100 | 4 | 42 | No |
| 26 | 26 | 2.4 | 2 | 2.0 | D | Excellent | 100 | 4 | 40 | No |

TABLE 2

| No. | Primer Liquid No. | Primer Film thickness (μm) | Hard coating Liquid No. | Hard coating Film thickness (μm) | Lens substrate | Appearance | Adhesion (%) | SW hardness | Dyeability (%) | Interference fringes |
|---|---|---|---|---|---|---|---|---|---|---|
| 27 | 27 | 1.3 | 2 | 2.0 | A | Excellent | 100 | 4 | 39 | No |
| 28 | 28 | 1.4 | 2 | 2.0 | A | Excellent | 100 | 4 | 41 | No |
| 29 | 29 | 0.6 | 2 | 2.0 | A | Excellent | 100 | 4 | 43 | No |
| 30 | 30 | 1.3 | 2 | 2.0 | A | Excellent | 100 | 4 | 39 | No |
| 31 | 31 | 2.5 | 1 | 2.0 | E | Excellent | 100 | 4 | 37 | No |
| 32 | 32 | 3.0 | 1 | 2.0 | F | Excellent | 100 | 4 | 37 | No |
| 33 | 33 | 3.0 | 1 | 2.0 | G | Excellent | 100 | 4 | 37 | No |
| 34 | 34 | 3.5 | 2 | 2.0 | A | Excellent | 100 | 4 | 39 | No |
| 35 | 35 | 1.5 | 2 | 2.0 | A | Excellent | 100 | 4 | 39 | No |
| 36 | 36 | 1.4 | 2 | 2.0 | A | Excellent | 100 | 4 | 38 | No |
| 37 | 37 | 1.5 | 2 | 2.0 | A | Excellent | 100 | 4 | 36 | No |
| 38 | 38 | 1.5 | 2 | 2.0 | A | Excellent | 100 | 4 | 38 | No |
| 39 | 39 | 1.5 | 2 | 2.0 | A | Excellent | 100 | 4 | 34 | No |
| 40 | 40 | 1.6 | 2 | 2.0 | A | Excellent | 100 | 4 | 33 | No |
| 41 | 41 | 1.5 | 2 | 2.0 | A | Excellent | 100 | 4 | 36 | No |
| 42 | 42 | 1.4 | 2 | 2.0 | A | Excellent | 100 | 4 | 38 | No |
| 43 | 43 | 1.4 | 2 | 2.0 | A | Excellent | 100 | 4 | 37 | No |
| 44 | 44 | 1.5 | 2 | 2.0 | B | Excellent | 100 | 4 | 39 | No |
| 45 | 45 | 1.5 | 2 | 2.0 | C | Excellent | 100 | 4 | 39 | No |
| 46 | 46 | 1.5 | 2 | 2.0 | A | Excellent | 100 | 4 | 39 | No |
| 47 | 47 | 1.6 | 2 | 2.0 | D | Excellent | 100 | 4 | 38 | No |
| 48 | 48 | 1.5 | 2 | 2.0 | A | Excellent | 100 | 4 | 39 | No |
| 49 | 49 | 1.5 | 2 | 2.0 | A | Excellent | 100 | 4 | 37 | No |
| 50 | 50 | 1.5 | 2 | 2.0 | A | Excellent | 100 | 4 | 39 | No |
| 51 | 51 | 1.3 | 3 | 2.0 | H | Excellent | 100 | 4 | 41 | No |
| 52 | 52 | 1.4 | 3 | 2.0 | H | Excellent | 100 | 4 | 40 | No |

TABLE 3

| No. | Primer Liquid No. | Primer Film thickness (μm) | Hard coating Liquid No. | Hard coating Film thickness (μm) | Lens substrate | Appearance | Adhesion (%) | SW hardness | Dyeability (%) | Interference fringes |
|---|---|---|---|---|---|---|---|---|---|---|
| 53 | 53 | 1.3 | 3 | 2.0 | H | Excellent | 100 | 4 | 37 | No |
| 54 | 54 | 1.3 | 3 | 2.0 | H | Excellent | 100 | 4 | 36 | No |
| 55 | 55 | 1.3 | 3 | 2.0 | H | Excellent | 100 | 4 | 39 | No |
| 56 | 56 | 1.3 | 3 | 2.0 | H | Excellent | 100 | 4 | 41 | No |
| 57 | 57 | 1.3 | 2 | 2.0 | A | Excellent | 0 | 4 | | No |
| 58 | 58 | 1.3 | 2 | 2.0 | A | Slightly whitened | 100 | 4 | 41 | No |
| 59 | 59 | 1.4 | 2 | 2.0 | A | Excellent | 0 | 4 | | No |
| 60 | 60 | 5.1 | 2 | 2.0 | A | Opaque | 100 | 4 | | No |
| 61 | 61 | 0.3 | 2 | 2.0 | A | Excellent | 100 | 4 | | No |
| 62 | 62 | 1.3 | 2 | 2.0 | A | Excellent | 0 | 4 | | No |
| 63 | 63 | 1.3 | 2 | 2.0 | A | Slightly whitened | 100 | 4 | 39 | Extremely |
| 64 | 64 | 1.4 | 2 | 2.0 | A | Defective | 100 | 4 | | Slightly |
| 65 | 65 | 1.2 | 2 | 2.0 | A | Whitened | 100 | 4 | | Yes |
| 66 | | | 1 | 2.0 | E | Excellent | 100 | 4 | 40 | No |
| 67 | | | 2 | 2.0 | A | Excellent | 100 | 4 | 41 | No |
| 68 | | | 3 | 2.0 | H | Excellent | 100 | 4 | 43 | No |

The following lens substrates were used as the above substrate. The method of application of the primer liquids and the method of application of the hard coating liquids were as described below.

Lens substrates

A: Plastic lens which had a refractive index of 1.594 and was formed of a urethane resin (a product obtained by curing under heat improved MR-6, a monomer supplied by Mitsui Totatsu Chemicals, Inc.)

B: Plastic lens which had a refractive index of 1.59 and was formed of a methacrylate polymer (a product obtained by curing under heat TS-26, a monomer supplied by Tokuyama Corporation.)

C: Plastic lens which had a refractive index of 1.59 and was formed of a polymer obtained by a urethane reaction and radical polymerization in combination (a product obtained by curing under heat ML-3, a monomer supplied by Mitsubishi Gas Chemical Co., Inc.)

D: Plastic lens which had a refractive index of 1.60 and contained a triazine ring as a main component (K-25 supplied by Kureha Rentec Co., Ltd.)

E: Plastic lens which had a refractive index of 1.56 and contained diallyl isophthalate as a main component F: Plastic lens which had a refractive index of 1.55 and contained a triazine ring as a main component (K-23 supplied by Kureha Rentec Co., Ltd.)

G: Plastic lens which had a refractive index of 1.56 and was formed from a fumaric acid derivative (a product obtained by curing under heat NK-55, a monomer supplied by Nippon Oil & Fats Co., Ltd.)

H: Plastic lens which had a refractive index of 1.66 and was formed of a urethane resin (a product obtained by curing under heat MR-7, a monomer supplied by Mitsui Totatsu Chemicals, Inc.)

Method of application of primer (1) Dipping in each coating liquid was carried out at a draw-up rate of 10 cm/minute.

(2) Primer liquid was dried at room temperature for about 10 minutes, and then cured under heat at 120° C. for 30 minutes.

Method of application of hard coating liquid (1) Dipping in each coating liquid was carried out at a draw-up rate of 15 cm/minute.

(2) Hard coating liquid was dried at room temperature for about 5 minutes, and then cured under heat at 120° C. for 1 hour.

Further, each evaluation test was carried out as follows.

Adhesion

Evaluated by a cross hatching test (according to a cross-cut adhesion test, JISK5400).

Steel wool test (SW hardness)

Rubbing with a steel wool #0000 was carried out under a load of 1 kg, and scratch conditions were relatively compared on the basis of the following ratings.

5: Had no scratch
4: Slightly scratched
3: Scratched
2: Intensely scratched
1: Scratched deep to a substrate Dyeability BPI GRAY supplied by Brain Power Inc. (U.S.A.) was diluted to 9% with distilled water, and the resultant aqueous solution was heated to 90° C. A lens coated with each of coating liquids was immersed in the aqueous solution for 5 minutes, then taken out and washed with water. The dyed lens was measured for a total light transmittance to compare dyeability.

Measurement of film thickness

Each of coating liquids was applied to a glass plate and cured, and the resultant coating was partly razed off to determine a film thickness on the basis of a height difference.

Example 5

An anti-reflection film formed of four layers of $ZrO_2$, $SiO_2$, $ZrO_2$ and $SiO_2$ was formed on each of the plastic lens substrates prepared in Example 4 by the vacuum vapor deposition method in the order of $ZrO_2$, $SiO_2$, $ZrO_2$ and $SiO_2$ from the hard coating side. The optical film thickness of each layer of the formed anti-reflection film was approximately $\lambda/12$, $\lambda/12$, $\lambda/2$ and $\lambda/4$ in the above order. $\lambda$ is the 520 nm wavelength of light. Tables 4 to 6 show the results of evaluations of the obtained lenses.

TABLE 4

Results of evaluations of lenses with anti-reflection films

| No. in Table 1 | Initial | | | After weatherbility test | | |
|---|---|---|---|---|---|---|
| | Appearance | Adhesion (%) | SW hardness | Appearance | Adhesion (%) | Impact resistance (J) |
| 1 | Excellent | 100 | 5 | Excellent | 100 | 0.48 |
| 2 | Excellent | 100 | 5 | Excellent | 100 | 0.39 |
| 3 | Excellent | 100 | 5 | Excellent | 100 | 1.91 |
| 4 | Excellent | 100 | 5 | Excellent | 100 | 1.95 |
| 5 | Excellent | 100 | 5 | Excellent | 100 | 1.80 |
| 6 | Excellent | 100 | 5 | Excellent | 100 | 0.49 |
| 7 | Excellent | 100 | 5 | Excellent | 100 | 0.60 |
| 8 | Excellent | 100 | 5 | Excellent | 100 | 0.47 |
| 9 | Excellent | 100 | 5 | Excellent | 100 | 0.46 |
| 10 | Excellent | 100 | 5 | Excellent | 100 | 0.58 |
| 11 | Excellent | 100 | 5 | Excellent | 100 | 0.48 |
| 12 | Excellent | 100 | 5 | Excellent | 100 | 1.85 |
| 13 | Excellent | 100 | 5 | Excellent | 100 | 1.68 |
| 14 | Excellent | 100 | 5 | Excellent | 100 | 1.00 |
| 15 | Excellent | 100 | 5 | Excellent | 100 | 0.45 |
| 16 | Excellent | 100 | 5 | Excellent | 100 | 0.48 |
| 17 | Excellent | 100 | 5 | Excellent | 100 | 0.50 |
| 18 | Excellent | 100 | 5 | Excellent | 100 | 0.47 |
| 19 | Excellent | 100 | 5 | Excellent | 100 | 0.49 |
| 20 | Excellent | 100 | 5 | Excellent | 100 | 0.45 |
| 21 | Excellent | 100 | 5 | Excellent | 100 | 0.48 |
| 22 | Excellent | 100 | 5 | Excellent | 100 | 0.70 |
| 23 | Excellent | 100 | 5 | Excellent | 100 | 1.84 |
| 24 | Excellent | 100 | 5 | Excellent | 100 | 1.01 |
| 25 | Excellent | 100 | 5 | Excellent | 100 | 0.85 |
| 26 | Excellent | 100 | 5 | Excellent | 100 | 1.50 |
| 27 | Excellent | 100 | 5 | Excellent | 100 | 1.79 |
| 28 | Excellent | 100 | 5 | Excellent | 100 | 1.75 |

TABLE 5

| No. in Table 1 | Initial | | | After weatherbility test | | |
|---|---|---|---|---|---|---|
| | Appearance | Adhesion (%) | SW hardness | Appearance | Adhesion (%) | Impact resistance (J) |
| 29 | Excellent | 100 | 5 | Excellent | 100 | 1.56 |
| 30 | Excellent | 100 | 5 | Excellent | 100 | 0.89 |
| 31 | Excellent | 100 | 5 | Excellent | 100 | 0.79 |
| 32 | Excellent | 100 | 5 | Excellent | 100 | 0.51 |
| 33 | Excellent | 100 | 5 | Excellent | 100 | 0.69 |
| 34 | Excellent | 100 | 5 | Excellent | 100 | 2.45 |
| 35 | Excellent | 100 | 5 | Excellent | 100 | 1.86 |
| 36 | Excellent | 100 | 5 | Excellent | 100 | 1.72 |
| 37 | Excellent | 100 | 5 | Excellent | 100 | 1.70 |
| 38 | Excellent | 100 | 5 | Excellent | 100 | 1.81 |
| 39 | Excellent | 100 | 5 | Excellent | 100 | 1.72 |
| 40 | Excellent | 100 | 5 | Excellent | 100 | 1.72 |
| 41 | Excellent | 100 | 5 | Excellent | 100 | 1.92 |
| 42 | Excellent | 100 | 5 | Excellent | 100 | 1.80 |
| 43 | Excellent | 100 | 5 | Excellent | 100 | 1.75 |
| 44 | Excellent | 100 | 5 | Excellent | 100 | 1.02 |
| 45 | Excellent | 100 | 5 | Excellent | 100 | 0.80 |
| 46 | Excellent | 100 | 5 | Excellent | 100 | 1.50 |
| 47 | Excellent | 100 | 5 | Excellent | 100 | 0.33 |
| 48 | Excellent | 100 | 5 | Excellent | 100 | 1.68 |
| 49 | Excellent | 100 | 5 | Excellent | 100 | 1.77 |
| 50 | Excellent | 100 | 5 | Excellent | 100 | 1.75 |
| 51 | Excellent | 100 | 5 | Excellent | 100 | 1.64 |
| 52 | Excellent | 100 | 5 | Excellent | 100 | 1.60 |
| 53 | Excellent | 100 | 5 | Excellent | 100 | 1.65 |
| 54 | Excellent | 100 | 5 | Excellent | 100 | 1.71 |
| 55 | Excellent | 100 | 5 | Excellent | 100 | 1.69 |
| 56 | Excellent | 100 | 5 | Excellent | 100 | 1.70 |

TABLE 6

| No. in Table 1 | Initial | | | After weatherbility test | | Impact resistance (J) |
| --- | --- | --- | --- | --- | --- | --- |
| | Appearance | Adhesion (%) | SW hardness | Appearance | Adhesion (%) | |
| 58 | Slightly whitened | 100 | 5 | Slightly whitened | 100 | 0.69 |
| 61 | Excellent | 100 | 5 | Excellent | 100 | 0.21 |
| 64 | Excellent | 100 | 5 | Excellent | 100 | 0.10 |
| 65 | Excellent | 100 | 5 | Excellent | 100 | 0.18 |
| 66 | Excellent | 100 | 5 | Excellent | 100 | 0.17 |

Each evaluation test was carried out as follows.

Impact resistance

According to ANSI Z80.1, a steel ball having a weight of 16.32 g was allowed to collide with the convex surface of a lens to carry out a breaking test. An impact resistance was expressed by an intermediate value between an energy amount in which the lens underwent breaking or cracking and an energy amount in which any change was not observed in the lens. The tested lens substrates were plastic lenses having a central thickness of 1.0 to 1.3 mm and having minus degrees.

Weatherability

Lenses were irradiated with a xenon weather-o-meter for 240 hours, and the resulting lenses were evaluated for appearance and adhesion.

EFFECTS OF THE INVENTION

According to the present invention, there is provided a primer composition which gives a cured film having a high refractive index and having impact resistance. By using the primer composition of the present invention, there can be provided a plastic lens having a high refractive index, which has an anti-reflection film and yet has impact resistance and moreover, is free of interference fringes.

What is claimed is:

1. A plastic lens comprising a plastic substrate having a refractive index of at least 1.50, a cured coating film from a primer composition and a coating in this order, said primer composition comprising at least one bromine compound selected from the group consisting of a compound of the following general formula (A),

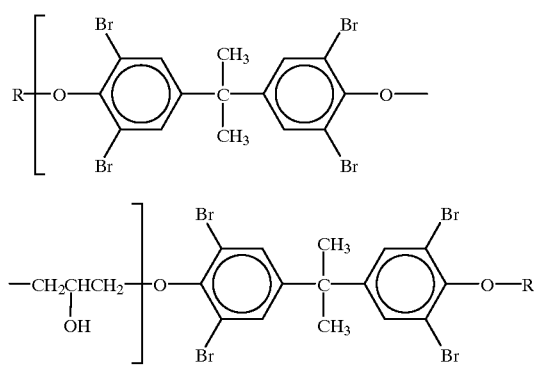

wherein R is

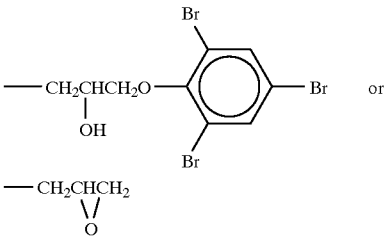

and n is a number from 1 to 10, and a compound of the following general formula (B),

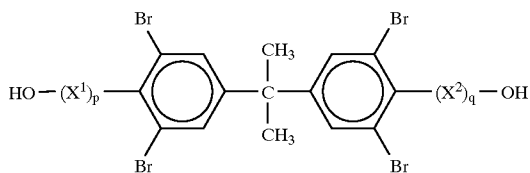

wherein $X^1$ is —$CH_2CH_2O$— or

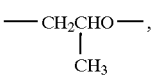

$X^2$ is —$OCH_2CH_2$— or

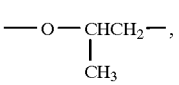

and each of p and q is independently a number from 1 to 3, and a polyisocyanate or a prepolymer obtained by reacting the at least one bromine compound and a polyisocyanate.

2. The plastic lens of claim 1, which contains, in addition to the bromine compound, 0.01 to 3 parts by weight, based on 1 part by weight of the bromine compound, of at least one polyol selected from the group consisting of a polyester polyol, a polyether polyol, an acryl polyol and a polycarbonate polyol.

3. The plastic lens of claim 1, wherein the polyester polyol is formed from a polybasic acid and a hydroxy compound, the polybasic acid being at least one organic carboxylic acid selected from the group consisting of phthalic acid, isophthalic acid, hydrogenated phthalic acid, adipic acid, linolenic acid dimer and maleic acid, the hydroxy compound being at least one compound selected from the group consisting of ethylene glycol, propylene glycol, butylene glycol, hexylene glycol, diethylene glycol, trimethylolpropane, hexantriol, glycerin, trimethylolethane and pentaerythritol.

4. The plastic lens of claim 1, wherein the polyisocyanate is prepared by blocking a cyclic trimer of hexamethylene diisocyanate with β-diketone and the primer composition is a one-pack composition.

5. The plastic lens of claim 1, wherein the polyisocyanate is a monomer, a modified product, an adduct or a prepolymer of a polyisocyanate having an aromatic ring.

6. The plastic lens of claim 5, wherein the polyisocyanate having an aromatic ring is xylylene diisocyanate or tetramethylxylene diisocyanate.

7. The plastic lens of claim 1, wherein the polyisocyanate has isocyanate groups blocked with a compound selected from the group consisting of β-diketone, diethyl malonate, dimethyl malonate, acetoxime and butanoneoxime.

8. The plastic lens of claim 1 or 2, wherein the primer composition further contains a curing catalyst.

9. The plastic lens of claim 1, which contains a prepolymer from the polyisocyanate and the bromine compound, in which an equivalent amount ratio (NCO/OH) of isocyanate groups (NCO) of the polyisocyanate and hydroxyl groups (OH) of the bromine compound is greater than 1:1 to 5:1.

10. The plastic lens of claim 2, wherein an equivalent amount ratio (NCO/OH) of polyisocyanate groups and the total hydroxyl groups of the bromine compound and the polyol is 1:1 to 5:1.

11. The plastic lens of claim 1 or 2, wherein the primer composition contains, as a solvent, at least one compound selected from the group consisting of a compound formed by converting one terminal OH group of ethylene glycol, diethylene glycol or propylene glycol to a methoxy, ethoxy or propoxy group and converting the other terminal OH group to an acetyloxy group, a compound formed by converting each of terminal OH groups of the above glycol to a methoxy, ethoxy or propoxy group, and a compound formed by optionally replacing a hydrogen atom of an alicyclic ketone with an alkyl group.

12. The plastic lens of claim 1 or 2, wherein the primer composition further contains a sol comprising metal oxide fine particles.

13. The plastic lens of claim 1, wherein the coating comprises a mixture containing the following three Components A, B and C:

A. a sol obtained by dispersing fine particles which are fine particles of at least one specific oxide selected from the group consisting of iron oxide, titanium oxide, cerium oxide, zirconium oxide, antimony oxide, zinc oxide and tin oxide, a mixture of these or a composite oxide of these and which have an average particle diameter in the range of from 1 to 100 nm, in water or other solvent, B. an epoxy-group-containing silicon compound of the following formula, or its partial hydrolyzate, $$R^1R^2_a Si(OR^3)_{3-a}$$

wherein $R_1$ is an epoxy-group-containing group having 2 to 12 carbon atoms, $R_2$ is an alkyl group having 1 to 6 carbon atoms, an aryl group, an alkenyl group, a halogenated alkyl group or a halogenated aryl group, $R^3$ is a hydrogen atom, an alkyl group having 1 to 4 carbon atoms or an acyl group, and a is 0, 1 or 2, and C. a compound which contains only one OH group or SH group in the molecule and further contains at least one group of —O—, —C(=O)—O—, —S(=O)—, —C(=O)—S— or —C(=S)—S— and further has at least one unsaturated group and which is soluble in water or a lower alcohol having 1 to 4 carbon atoms.

14. The plastic lens of claim 1, which further has an anti-reflection film on the coating.

* * * * *